(12) United States Patent
Escalona

(10) Patent No.: US 9,916,281 B2
(45) Date of Patent: *Mar. 13, 2018

(54) PROCESSING SYSTEM WITH A SECURE SET OF EXECUTABLE INSTRUCTIONS AND/OR ADDRESSING SCHEME

(71) Applicant: STMicroelectronics SA, Montrouge (FR)

(72) Inventor: Philippe Escalona, Chatillon (FR)

(73) Assignee: STMicroelectronics SA, Montrouge (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,006

(22) Filed: May 19, 2017

(65) Prior Publication Data

US 2017/0255591 A1 Sep. 7, 2017

Related U.S. Application Data

(63) Continuation of application No. 14/511,843, filed on Oct. 10, 2014, now Pat. No. 9,684,631.

(30) Foreign Application Priority Data

Oct. 17, 2013 (FR) ...................... 13 60126

(51) Int. Cl.
| | | |
|---|---|---|
| *G06F 9/30* | (2006.01) | |
| *G06F 9/40* | (2006.01) | |
| *G06F 15/76* | (2006.01) | |
| *G06F 21/00* | (2013.01) | |
| *G06F 21/75* | (2013.01) | |

(52) U.S. Cl.
CPC .......... *G06F 15/76* (2013.01); *G06F 9/30156* (2013.01); *G06F 21/00* (2013.01); *G06F 21/75* (2013.01)

(58) Field of Classification Search
None
See application file for complete search history.

(56) References Cited

U.S. PATENT DOCUMENTS

| | | | | |
|---|---|---|---|---|
| 5,974,508 | A * | 10/1999 | Maheshwari | G06F 12/126 710/200 |
| 6,138,229 | A | 10/2000 | Kucukcakar et al. | |
| 6,665,796 | B1 * | 12/2003 | Folmsbee | G06F 9/30145 712/E9.028 |
| 2002/0172179 | A1 | 11/2002 | Grimsrud | |

(Continued)

FOREIGN PATENT DOCUMENTS

| | | |
|---|---|---|
| EP | 0257952 A2 | 3/1988 |
| EP | 1357459 A1 | 10/2008 |

*Primary Examiner* — Michael Sun
(74) *Attorney, Agent, or Firm* — Slater Matsil, LLP

(57) ABSTRACT

A method for securing a data processing system having a processing unit is disclosed. At least a group of N1 digital words of m1 bits is selected from among the set of M1 digital words. N1 is less than M1. These words are selected in such a way that each selected digital word differs from all the other selected digital words by a number of bits at least equal to an integer p which is at least equal to 2. The group of N1 digital words of m1 bits forms at least one group of N1 executable digital instructions. The processing unit is configured to make it capable of executing each instruction of the at least one group of N1 executable digital instructions.

22 Claims, 11 Drawing Sheets

(56) References Cited

U.S. PATENT DOCUMENTS

| | | | |
|---|---|---|---|
| 2002/0194443 A1* | 12/2002 | Eustis | G11C 8/00 |
| | | | 711/167 |
| 2004/0098608 A1 | 5/2004 | Teglia | |
| 2004/0133794 A1 | 7/2004 | Kocher et al. | |
| 2008/0126766 A1* | 5/2008 | Chheda | G06F 9/30003 |
| | | | 712/226 |
| 2008/0320247 A1 | 12/2008 | Morfey et al. | |
| 2011/0296440 A1 | 12/2011 | Laurich et al. | |
| 2015/0143125 A1* | 5/2015 | Nix | H04W 52/0235 |
| | | | 713/171 |

* cited by examiner

FIG.8

| ID | GR |
|---|---|
| 0x00 | 0 |
| 0x01 | 1 |
| 0x02 | 2 |
| 0x03 | 3 |
| 0x04 | 4 |
| 0x05 | 5 |
| 0x06 | 6 |
| 0x07 | 7 |
| 0x08 | 7 |
| 0x09 | 6 |
| 0x0A | 5 |
| 0x0B | 4 |
| 0x0C | 3 |
| 0x0D | 2 |
| 0x0E | 1 |
| 0x0F | 0 |

| ID | GR |
|---|---|
| 0x10 | 8 |
| 0x11 | 9 |
| 0x12 | 10 |
| 0x13 | 11 |
| 0x14 | 12 |
| 0x15 | 13 |
| 0x16 | 14 |
| 0x17 | 15 |
| 0x18 | 15 |
| 0x19 | 14 |
| 0x1A | 13 |
| 0x1B | 12 |
| 0x1C | 11 |
| 0x1D | 10 |
| 0x1E | 9 |
| 0x1F | 8 |

| ID | GR |
|---|---|
| 0x20 | 11 |
| 0x21 | 10 |
| 0x22 | 9 |
| 0x23 | 8 |
| 0x24 | 15 |
| 0x25 | 14 |
| 0x26 | 13 |
| 0x27 | 12 |
| 0x28 | 12 |
| 0x29 | 13 |
| 0x2A | 14 |
| 0x2B | 15 |
| 0x2C | 8 |
| 0x2D | 9 |
| 0x2E | 10 |
| 0x2F | 11 |

| ID | GR |
|---|---|
| 0x30 | 3 |
| 0x31 | 2 |
| 0x32 | 1 |
| 0x33 | 0 |
| 0x34 | 7 |
| 0x35 | 6 |
| 0x36 | 5 |
| 0x37 | 4 |
| 0x38 | 4 |
| 0x39 | 5 |
| 0x3A | 6 |
| 0x3B | 7 |
| 0x3C | 0 |
| 0x3D | 1 |
| 0x3E | 2 |
| 0x3F | 3 |

FIG.10

| h = 3 |
|---|
| 0 0 0 0 0 ← MNS$_1$ |
| 0 0 1 1 1 ← MNS$_2$ |
| 1 1 0 0 1 ← MNS$_3$ |
| 1 1 1 1 0 ← MNS$_4$ |

PROCESSING SYSTEM WITH A SECURE SET OF EXECUTABLE INSTRUCTIONS AND/OR ADDRESSING SCHEME

CROSS-REFERENCE TO RELATED APPLICATIONS

This application is a continuation of U.S. patent application Ser. No. 14/511,843, filed on Oct. 10, 2014, which claims the benefit of French Application No. 1360126, filed on Oct. 17, 2013, which application are hereby incorporated herein by reference.

TECHNICAL FIELD

The present invention relates generally to a processing system and method, and, in particular embodiments, to a system and method for securing a set of executable instructions and/or an addressing scheme of a complete system.

BACKGROUND

In some applications, some instructions may be critical in terms of security, for example instructions relating to the verification of the PIN code of a smart card. When a fault injection attack is made, typically by using a laser beam, an attacker may attempt to modify a bit of an instruction in order, for example, to examine the behavior of the card and thereby obtain information on secret data.

Moreover, at the present time, executable instructions leading to opposite actions may have similar binary values. For example, if the hexadecimal data element 0x50 is the value of an instruction of the "jump if equal" type, the hexadecimal value 0x51 may be the value of the instruction "jump if not equal".

Therefore the modification of the last bit of one of these two instructions, by a laser beam attack for example, may have serious consequences for the security of the processor, and thus for the application.

Moreover, at the present time, the distribution of the addresses (the addressing scheme) of the storage units and peripherals of a data processing system is often organized in blocks, grouped to a greater or lesser extent by type of storage and by property.

However, the different address ranges of the storage units and peripherals may be similar to each other, which may be harmful in terms of security. This is because, if a data loading instruction ("Load"), for example, contains the destination address of the data element in a certain storage unit, the modification of a particular bit in this address may have serious consequences and may cause the data element to be loaded into a different storage unit from the one originally specified.

SUMMARY

Methods of application and embodiments of the invention relate to the securing of certain aspects of a data processing system, for example, the securing of a set of executable instructions, and/or the securing of the addressing scheme used in the data processing system, against attacks by fault injection.

The invention is advantageously, but not exclusively, applicable to data processing systems whose processing unit includes, for example, a microcontroller or a microprocessor, including, but not limited to, those incorporated in integrated circuit cards, such as smart cards.

In one application and embodiment, it is proposed to provide further security for the set of instructions and/or the addressing scheme of a data processing system, with the aim, notably if this system is implemented in a integrated circuit card, of making them less sensitive to fault injection attacks.

According to one aspect, a method is proposed for securing a data processing system including a processing unit.

In a method according to this aspect, a set of M1 digital words of m1 bits is generated. At least a group of N1 digital words of m1 bits is selected from among the set of M1 digital words. N1 is less than M1. These words are selected in such a way that each selected digital word differs from all the other selected digital words by a number of bits at least equal to an integer p which is at least equal to 2. The group of N1 digital words of m1 bits form at least one group of N1 executable digital instructions. The processing unit is configured to make it capable of executing each instruction of the at least one group of N1 executable digital instructions.

N1 may be an integer power of two, for example $2^{n1}$. M1 may also be an integer power of two, for example $2^{m1}$, where m1 is greater than n1.

This set of executable digital instructions is a secured set which is more robust against fault injection attacks, as described below in greater detail.

These N1 secured executable digital instructions correspond to N1 operations that can be executed by the processing unit, for example operations of the "jump", "conditional jump" ("jump if" or "jump if not"), and "addition" ("add") types. The executable digital instructions (machine code) used in a computer program to be executed by the processing unit belong to this set of secured executable instructions. This machine code is, for example, stored in a program store of the data processing system. This machine code may be produced directly by the programmer on the basis of the set of secured instructions, or by the compilation of a text written in a high level language (C or C++ for example) in a compiler adapted to the set of secured instructions.

This being the case, if the processing unit is a microprocessor, for example, it generally has a logic core including logic gates and pipeline stages. This logic core has to be configured, typically by using conventional software tools, in such a way that the microprocessor can actually execute each of the N1 desired operations (addition, jump, conditional jump, subtraction, multiplication, etc.) when it receives at its input each of the N1 corresponding secured executable digital instructions. Once this configuration of the microprocessor is complete, it is "hard-coded" and associated in a one-to-one way with the N1 secured executable instructions.

The processing unit may also be a virtual machine, for example an emulator or an interpreter, and the N1 secured executable digital instructions may be virtual instructions, of the Java bytecode type for example. As mentioned above, the N1 instructions generated in this way are secured.

This is because, with this method, the N1 digital instructions all differ from each other by a number of bits equal to not less than p. In other words, in this case the Hamming distance, which is the number of bits of difference between two digital instructions, is at least equal to p, which is itself at least equal to 2.

Persons skilled in the art will be able to choose the value of p and the value of m1 according to the chosen application and the desired level of security. By way of example, for a set of 16 instructions, it is possible to define 16 digital words of 8 bits each in a set of $2^8$ digital words (m1=8), each selected digital word having a Hamming distance greater than or equal to 4(p=4) from all the other digital words.

In other words, for each instruction, there is no other instruction which differs from the instruction by a number of bits smaller than 4.

Program instructions stored in the program store and obtained from a set of secured instructions of this type are thus more robust against attacks made by fault injection into the program store. This is because it becomes much more difficult to change 4 or more bits simultaneously in order to reach another instruction of the set of secured instructions.

It may also be considered that the other digital words, that is to say those which have not been selected because they have a Hamming distance of less than p, would be treated by the processing unit as invalid instructions, because the unit has not been configured for instructions of this type. For example, if the processor attempts to execute an instruction of this type considered as invalid, a special invalidity process may be executed, for example the issue of a special alert signal or the blocking of the card if the processing unit is incorporated in this card.

The set of executable instructions may comprise a plurality of groups $GR_i$ of $N1_i$ digital instructions. The digital instructions of a single group meet a similarity criterion. The similarity criteria associated respectively with the groups all is different from each other. Thus, for example, a first group may contain the instructions which all have the same number of operands, while a second group may contain instructions relating to operations of a single type jump, conditional jump, etc.). The groups of digital instructions may contain identical or different numbers of instructions. In other words, for two different groups $GR_i$ and $GR_j$, the numbers $N1_i$; and $N1_j$ may be equal or different.

Thus, in one embodiment, the selection comprises selection, from among the set of M1 (equal to $2^{m1}$ for example) digital words, of a plurality of groups of $N1_i$ digital words (the sum of all the $N1_i$ digital words being less than or equal to M1), in such a way that each selected word of a group differs from all the other selected words of the group by a number of bits at least equal to p, the groups of $N1_i$ digital words forming groups of $N1_i$ executable digital instructions.

The method according to this embodiment then comprises configuration of the processing unit to make it capable of executing each instruction of the groups of digital instructions.

In a particular case, each number $N1_i$ may be an integer power of two, for example $2^{n1}$.

Thus, within each group, the digital instructions differ from each other by a number of bits at least equal to p. It therefore becomes particularly difficult for an attacker to modify an instruction within a group without the risk of changing groups.

Furthermore, there is no need to provide any Hamming distance between two instructions belonging to two different groups.

Thus, according to one embodiment, a digital instruction of at least one rank rg of a group of rank i may differ by only one bit from the digital instruction of rank rg' of the group of rank j, j being different from i. Also, rg' may be equal to or different from rg.

Here again, digital words not belonging to any group may be considered as invalid instructions.

According to another aspect, a method is proposed for developing a secured addressing scheme within a data processing system, the scheme being organized by address blocks and including N2 address blocks, the address words having n2 bits each.

According to a general characteristic of this aspect, the method comprises generating a set of $2^{m2}$ digital words of m2 bits, where m2 is less than n2 and greater than or equal to 2. N2 digital words of m2 bits are selecting from among the set of $2^{m2}$ digital words, in such a way that each selected digital word differs from all the other selected digital words by a number of bits equal to at least an integer h which is greater than or equal to 2. The m2 bits of the N2 selected digital words are assigned to the N2 address blocks address words whose m2 most significant bits are, respectively.

M2 is the result of a compromise between the desired security level, that is to say the number h, the number of blocks N2 and their maximum size. Persons skilled in the art will be able to adjust these parameters according to the desired application and the desired security level.

Thus, for example, with address words of 32 bits (n2=32), a value m2 equal to 5, and an integer h equal to 3, it is possible to choose N2=4 digital words of 5 bits, assigned, respectively, to 4 address blocks whose five most significant bits are, respectively, the five bits of the four selected digital words. It is then possible, for example, to assign a first type of storage (for example, a bootstrap flash memory) to address block 1, an internal random-access memory to address block 2, an external random-access memory to address block 3 and a set of peripherals to address block 4, any other combination of most significant bits being considered to be invalid addresses.

In terms of security, an attacker would have to modify three or more bits in this case, to have a chance of obtaining a valid address of another address block.

If a secure set of executable instructions and a secure addressing scheme are developed at the same time, the numbers p and h may be identical or different. Similarly, the numbers m1 and m2, n1 and n2, and N1 and N2 may be, respectively, identical or different.

In one embodiment, at least one of the address blocks, for example the one associated with a set of peripherals, may have M address sub-blocks, intended, for example, to be associated with M different types of peripheral.

Thus, according to one embodiment, the method comprises generating a set of $2^r$ digital words of r bits, where r is less than or equal to n2-m2, and greater than or equal to 2. M digital words are selected from among the set of $2^r$ digital words, in such a way that each selected digital word differs from all the other selected digital words by a number of bits at least equal to an integer s which is at least equal to 2 (this integer s may be equal to or different from h). The r bits of the M selected digital words are assigned to at least one of the address blocks address words whose r bits following the m2 most significant bits are, respectively.

Here again, therefore, the address sub-block associated with one type of peripherals differs from another address sub-block by a number of bits at least equal to s, and here again it becomes difficult for an attacker to be able to modify s bits or more simultaneously in order to have a chance of reaching another type of peripheral.

According to another aspect, a processing unit to be incorporated into a data processing system is proposed, the processing unit comprising processor configured to be capable of executing each instruction of a set of executable digital instructions of m1 bits including at least a group of N1 digital words of m1 bits, where 2m1 is greater than N1, each digital word differing from all the other digital words of the at least one group by a number of bits at least equal to an integer p which is at least equal to 2.

N1 may be an integer power of two, for example $2^{n1}$, where n1 is less than m1.

According to one embodiment, in the presence of a digital word other than those of the at least one group, the processing unit is configured to execute a special invalidity process.

According to one embodiment, the processing unit is configured to execute each instruction of a set of executable digital instructions of m1 bits including a plurality of groups of digital words of m1 bits, each digital word of a group differing from all the other digital words of the group by a number of bits at least equal to 2, the digital instructions of a given group meeting a similarity criterion, the similarity criteria respectively associated with the groups all being different from each other.

According to one embodiment, a digital instruction of at least one rank rg of a group of rank i may differ by only one bit from the digital instruction of rank rg' of the group of rank j, j being different from i.

According to one embodiment, in the presence of a digital word not belonging to any group, the processing unit is configured to execute a special invalidity process.

The processing unit may be a microprocessor or a microcontroller.

According to another aspect, a data processing system is proposed, comprising a processing unit as defined above and program storage unit intended to store digital program instructions defining a program to be executed by the processing unit and belonging to the set of executable instructions.

According to another aspect, a data processing system is proposed, comprising a processing unit, for example a microprocessor or a microcontroller, and elements addressable by address words of n2 bits belonging to an addressing scheme which uses address blocks and which has N2 address blocks.

According to a general characteristic of this aspect, the address words assigned to the N2 address blocks each include a first group of m2 most significant bits, m2 being less than n2 and greater than or equal to 2, each first group of an address word assigned to one of the N2 blocks differing from all the N2-1 other first groups of the other address words assigned to the N2-1 other blocks by a number of bits at least equal to an integer h which is greater than or equal to 2.

According to one embodiment, N2 elements associated with the N2 address blocks include elements chosen from among the storage units and a set of peripherals.

According to one embodiment, at least one of the address blocks has M address sub-blocks, and the address words assigned to the at least one of the address blocks each have, after the first group of m2 most significant bits, a second group of r bits, r being less than or equal to n2-m2 and greater than or equal to 2, each second group of an address word assigned to one of the M address sub-blocks differing from all the M-1 other second groups of the other address words in the M-1 other sub-blocks by a number of bits at least equal to an integer s which is greater than or equal to 2.

According to one embodiment, the element associated with the at least one of the blocks is a set of peripherals, and the M elements associated with the M address sub-blocks are M particular types of peripheral.

The processing unit may be a processing unit as defined above, that is to say one whose processing methods are configured to execute a set of executable digital instructions secured by a Hamming distance. In this context, as mentioned above, p and h may be identical or different.

According to another aspect, an integrated circuit is proposed, incorporating a processing unit as defined above or a data processing system as defined above.

This integrated circuit may be incorporated, for example, in a smart card.

BRIEF DESCRIPTION OF THE DRAWINGS

Other advantages and features of the invention will be made clear by the detailed description of applications and embodiments, which is not limiting in any way, and the appended drawings, in which:

FIGS. 1 to 12 show schematically some different applications and embodiments of the different aspects of the invention.

DETAILED DESCRIPTION OF ILLUSTRATIVE EMBODIMENTS

Figure 1:
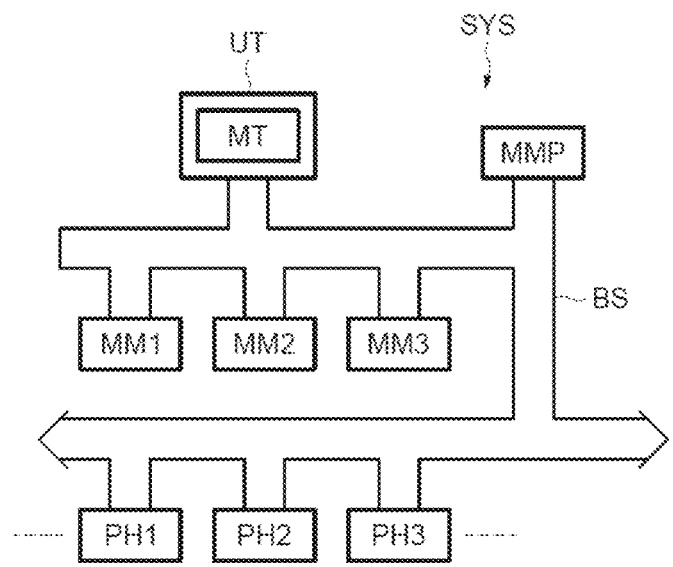

In FIG. 1, the reference SYS denotes a data processing system having a processing unit UT, for example a microcontroller or a microprocessor, having a processor MT (processing means), connected via a bus BS to program storage unit MMP and to different storage units MM1, MM2, MM3 and to different peripherals PH1, PH2, PH3 . . . .

At least some of these peripherals, for example the peripherals PH1 and PH2, are peripherals of the same type, for example, controllers, while the peripheral PH3 and other peripherals, not shown here for the sake of simplicity, are peripherals of another type, for example clock generation systems.

Figure 2:
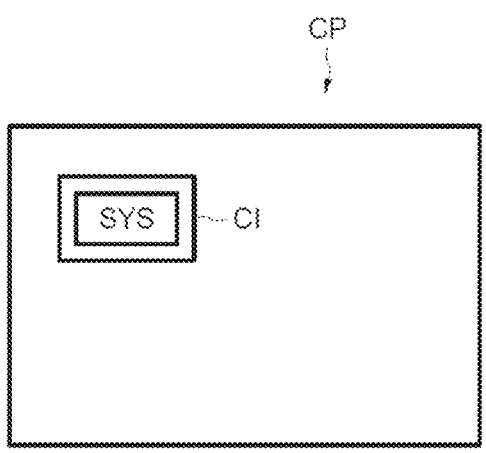

The system SYS may be, as shown in FIG. 2, incorporated into an integrated circuit CI which is itself integrated into an integrated circuit card or a smart card CP.

Reference will now be made in a more detailed way to FIGS. 3 to 8 in order to describe an example of the development of a set of secured executable instructions which can be executed by the processing unit UT.

It is assumed here that the set of instructions executable by the processing unit comprises $2^{m1}$ executable instructions formed by words of m1 bits.

Figure 3:
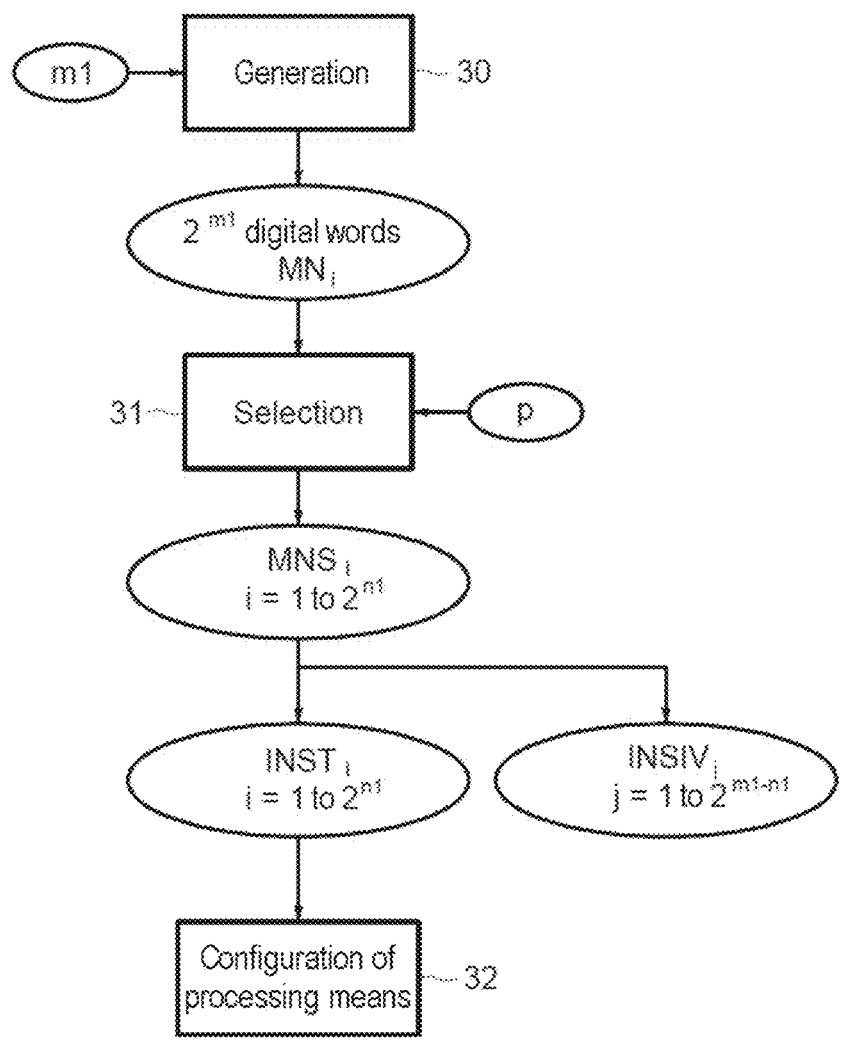

In this example, a set of $2^{m1}$ digital words of m1 bits, $MN_i$, is initially generated (step 30, FIG. 3). The variable m1 is chosen so as to be greater than n1.

Then, in step 31, a group of $2^{n1}$ digital words of m1 bits, $MNS_i$, is selected from the set of $2^{m1}$ digital words $MN_i$. The words $MNS_i$ are selected in such a way that each selected digital word $MNS_i$ differs from all the other selected digital words by a number of bits at least equal to an integer p which is at least equal to 2. In other words, the Hamming distance between two selected digital words is at least equal to p.

The set of $2^{n1}$ selected digital words $MNS_i$ then forms the group of $2^{n1}$ executable instructions $INST_i$.

The digital words not selected in the set of $2^{m1}$ digital words $MN_i$ may then, for example, be considered as invalid instructions $INSIV_j$.

On the basis of these executable instructions $INST_i$, a programmer may develop a program whose digital program instructions (taken from among this set of secured executable instructions $INST_i$) may be stored in program storage unit MMP.

This being the case, the processor of the microprocessor or microcontroller UT generally has a logic core including logic gates and pipeline stages. This logic core has to be configured, typically by using conventional software tools, in such a way that the microprocessor can effectively execute each of the $2^{n1}$ desired operations (addition, jump, conditional jump, subtraction, multiplication, etc.) when it receives at its input each of the $2^{n1}$ corresponding secured executable digital instructions. Once this configuration of the microprocessor is complete, it is "hard-coded" and associated in a one-to-one way with the $2^{n1}$ secured executable instructions.

Step 32 of FIG. 3 shows the configuration of the processor MT of the microprocessor UT for making them capable of executing each of the instructions of the set of executable digital instructions which has just been generated.

Figure 4:
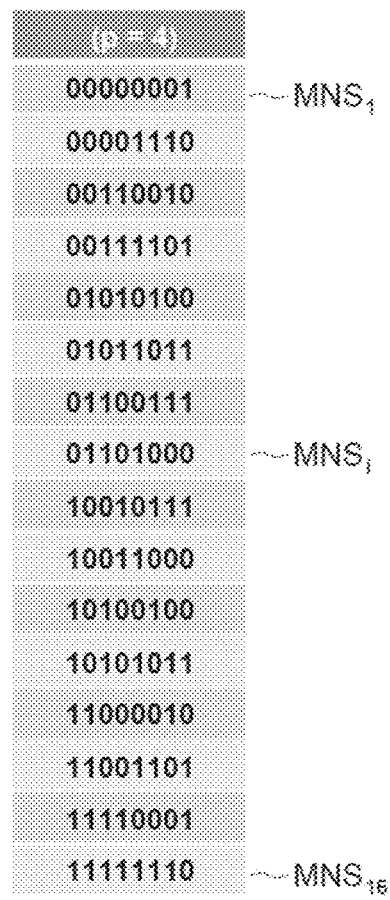

FIG. 4 shows an example of a set of 16 instructions (n=4) selected from a set of 256 digital words (m=8) of 8 bits each. In this example, the number p has been chosen so as to be equal to 4.

Therefore, as shown in FIG. 4, the 16 selected digital words $MNS_1$-$MNS_{16}$, corresponding to the 16 8-bit instructions of the set of instructions, are such that each selected digital word $MNS_i$ differs from the other selected digital words by a number of bits at least equal to 4.

Thus an attacker wishing to carry out a fault injection attack will have to be able to change 4 bits of an instruction in order to have a chance of reaching a valid executable instruction. The robustness of this set of executable instructions against a fault injection attack is therefore greatly enhanced.

In the example described above, it was assumed that the set of executable instructions contained only one group of $2^{n1}$ digital instructions of m1 bits each.

This being the case, it is entirely possible that the set of executable instructions may comprise a plurality of groups GR1-GRg which, in this example, each have $2^{n1}$ instructions.

Figure 5:
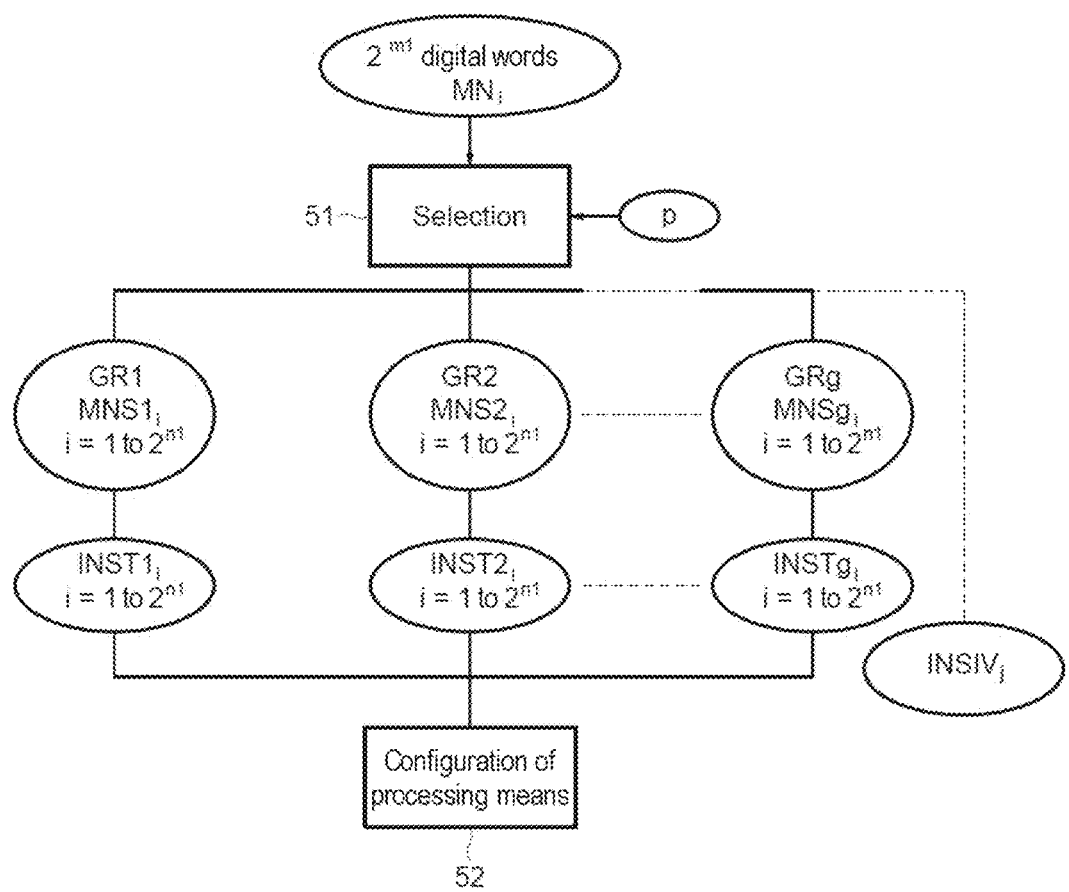

Therefore, as shown in FIG. 5, starting with $2^{m1}$ digital words $MN_i$, the different groups GRg of selected digital words are selected (step 51), taking the number p into account.

Thus the group GR1 comprises $2^{n1}$ selected digital words $MNS1_i$, the group GR2 comprises $2^{n1}$ selected digital words $MNS2_i$, and the group of rank g comprises $2^{n1}$ selected digital words $MNSg_i$.

Here again, within each group, a selected digital word differs from the other selected digital words by a number of bits at least equal to p.

However, it is not necessary for a digital word $MNS1_i$ to differ from a selected digital word of another group, for example the digital word $MNS2_i$, by a number of bits at least equal to p.

The different selected digital words of different groups then form, respectively, the $2^{n1}$ executable instructions of the different groups.

Thus a first group GR1 is formed by the $2^{n1}$ executable instructions $INST1_i$, corresponding to the selected digital words $MNS1_i$, while the $2^{n1}$ instructions $INST2_i$ of the group GR2 correspond to the $2^{n1}$ selected digital words $MNS2_i$, and so on.

It then becomes possible to group instructions meeting the same similarity criterion within the same group, given that the similarity criteria differ from one group to another.

Thus, the instructions $INST1_i$ which have the same number of operands can be grouped in group GR1, while the instructions $INST2_i$ which perform the same type of operation (for example jumps, conditional jumps, etc.) can be grouped in group GR2, for example.

Starting from these executable instructions $INST1_i$, $INST2_i$, $INSTg_i$, a programmer can develop a program whose digital program instructions (taken from this set of secured executable instructions $INST1_i$, $INST2_i$, $INSTg_i$) can be stored in the program storage unit MMP.

Here again, an attacker wishing to replace an instruction belonging to a group with another instruction belonging to the same group would again have to modify simultaneously at least p bits, for example 4 bits if p is equal to 4.

Step 52 of FIG. 5 shows the configuration of the processor MT of the microprocessor UT for making them capable of executing each of the instructions of the set of executable digital instructions $INST1_i$, $INST2_i$, $INSTg_i$ which has just been generated.

On the other hand, if it is impossible or undesirable to divide the whole set of $2^{m1}$ digital words into groups, there may be some remaining unselected digital words belonging to no group. In this case, as shown in FIG. 5, and by analogy with what has been described above, these unselected digital words may be considered as invalid instructions $INSIV_j$.

Figure 6:
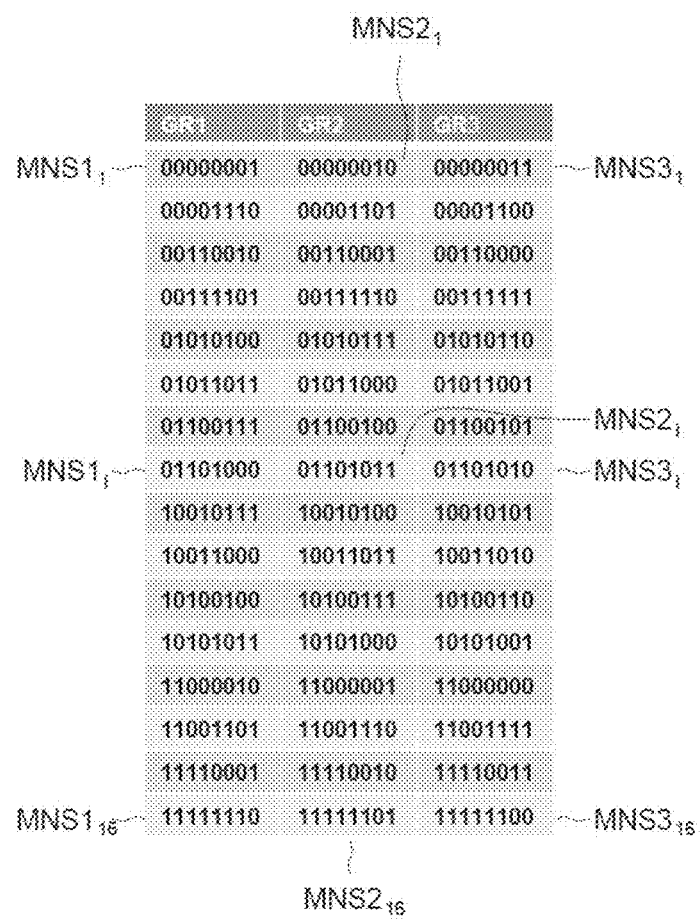

FIG. 6 shows an example of three groups GR1, GR2, GR3 of 16 selected digital words corresponding to 16 instructions, these three groups coexisting in the initial set of $2^8$ digital words.

In each group, each selected digital word, and therefore each instruction, has a Hamming distance greater than or equal to 4 from all the other selected digital words of the same group.

It should also be noted here that, for at least some of the ranks, rank 1 for example, and for at least some of the groups, groups GR2 and GR3 for example, the digital word $MNS2_1$ differs from the selected digital word $MNS3_1$ by only one bit.

An instruction modified by a laser beam attack may therefore result in a change of group, which is disturbing for the attacker.

In this example, the group GR1 may be assigned to branching instructions, while the group GR2 may be assigned to instructions having an operand and the group 3 may be assigned to instructions having two operands.

Figure 7:
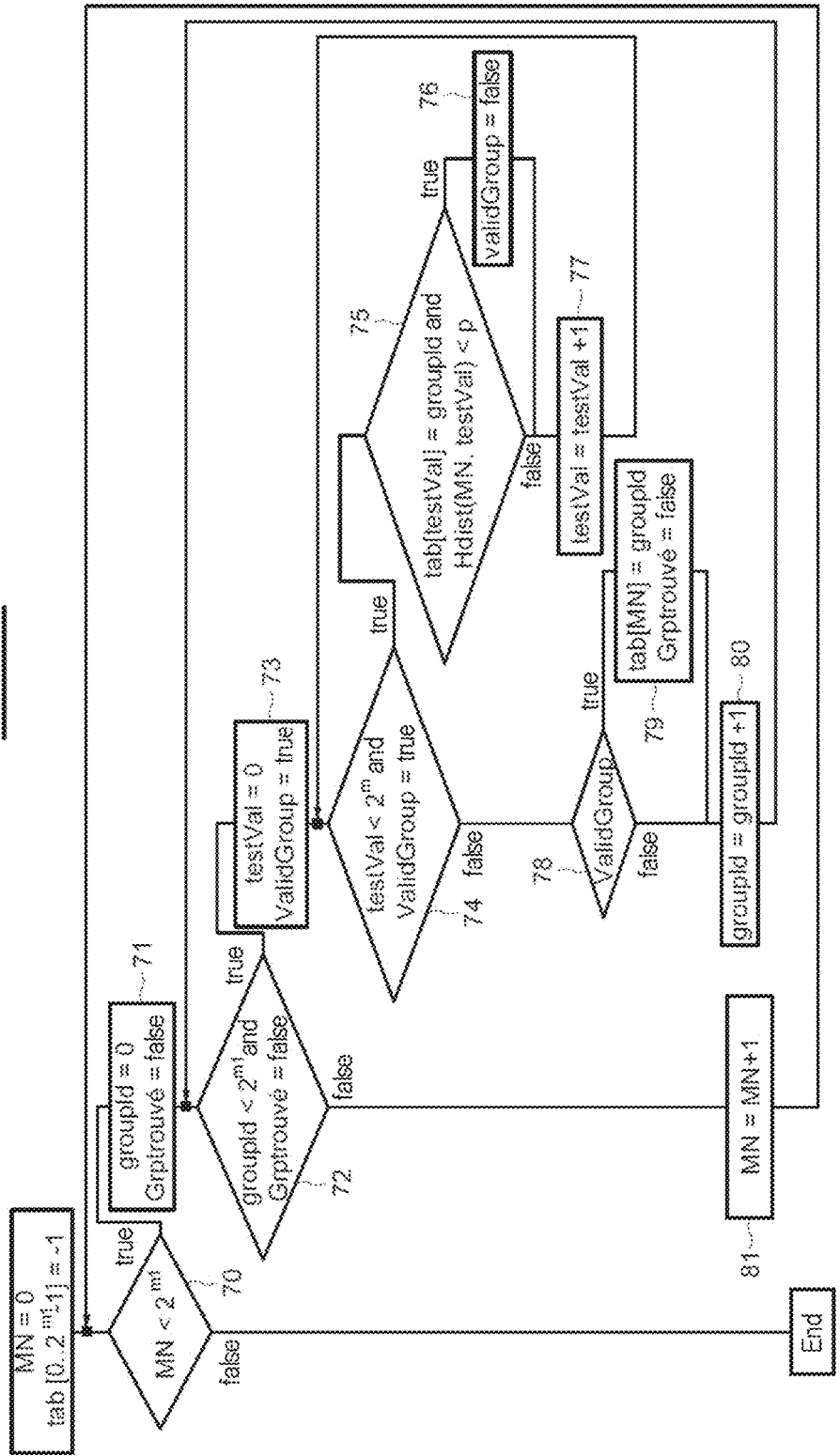

FIG. 7 shows an example of an algorithm for assigning a digital word MN from among the $2^{m1}$ digital words to a group. This algorithm can also be used to handle the generation of a plurality of groups conforming to the criteria defined above.

This algorithm can easily be implemented in a microcomputer, for example a PC.

This case is purely a non-limiting example.

This algorithm will scan all the values MN of the digital words from 0 to $2^{m1}$-1. For each value MN, a parameter denoted "tab" is assigned, this parameter being set to 1 for all the digital words at the outset. At the end of the algorithm, the group identifier of a digital word is the value of the parameter associated with this digital word.

If the group identifier has a value of −1, the corresponding digital word has no group.

In step 70, a check is made as to whether the value of the digital word MN is less than $2^{m1}$. If this is the case, the group identifier, "groupId", is set to 0, and a logical variable "Grptrouvé" is set to the false state.

In step 72, a test is conducted as to whether the identifier groupId is less than $2^{m1}$, and whether the variable Grptrouvé is in the false state.

If this is the case, a value "testVal" is set to 0, and a logical variable "validGroup" is set to the true state.

In step 74, a test is conducted as to whether the variable testVal is less than $2^{m1}$, and whether the logical variable validGroup is in the true state.

If this is the case, the algorithm moves to step $_{75}$, in which a test will be conducted as to whether the value of the parameter associated with the variable testVal is equal to the identifier groupId, and whether the Hamming distance between the current digital word MN and the value testVal is less than p.

If this is the case, the value "false" is assigned to the variable validGroup (step 76), whereas, if the result of the test of step 75 is false, the variable testVal is incremented by 1 (step 77). The algorithm then returns to step 74.

If the result of the test of step 74 is found to be false, the state of the logical variable validGroup is tested (step 78).

If this variable is in the true state, the algorithm moves to step 79, in which the value of the variable groupId is assigned to the parameter "tab" associated with the digital word MN, and the true value is assigned to the logical variable "Grptrouvé".

The algorithm then moves to step 8o in which the variable groupId is incremented by 1.

On the other hand, if valid Group has the false value in step 78, the algorithm moves directly to step 80.

At the end of step 80, the algorithm returns to step 72. If the test result is false in step 72, the algorithm moves to the next digital word (step 81) and returns to step 70.

If the test result is false in step 70, the algorithm stops, and a group has or has not been assigned to each of the digital words, while, in each of these groups, the selected digital words meet the condition of a Hamming distance at least equal to p.

FIG. 8 provides an extract from the result of the algorithm for 256 digital words, showing, for each digital word MN (only the digital words 0×00 to 0×3F are shown here), the number of the group in which it will be placed.

Figure 9:
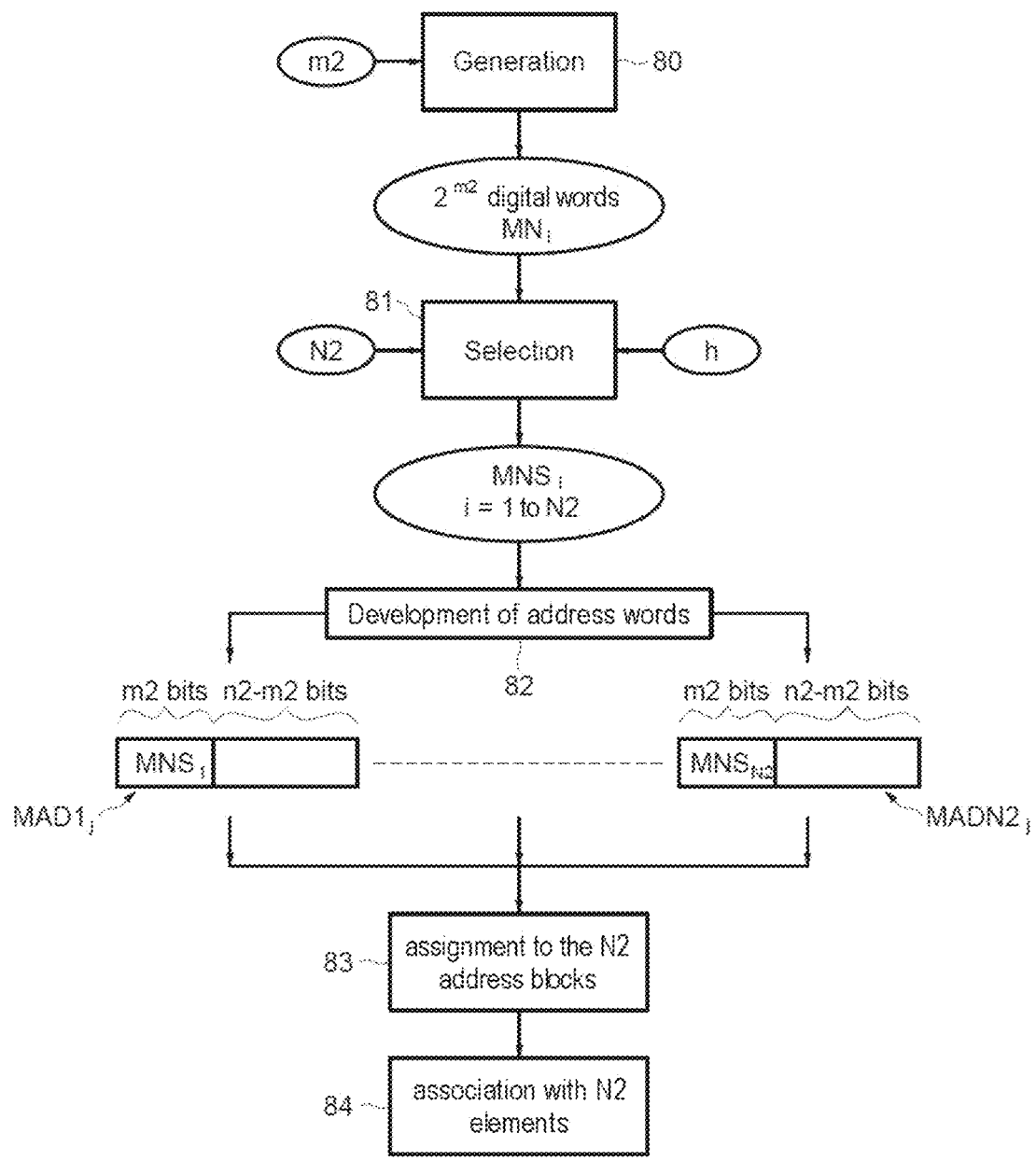

The same concept of a minimum Hamming distance between digital words can be used, as shown in FIG. 9, to develop a secured addressing scheme within the data processing system SYS.

In FIG. 9, the minimum Hamming distance is h, but it would obviously be possible to choose a minimum Hamming distance h which was equal to p, as in the securing of the set of executable instructions described above.

In this case, the addressing scheme is organized in address blocks, and has N2 address blocks. The address words used in the addressing scheme have n2 bits in this case, for example 32 bits.

A number m2, less than n2 and greater than or equal to 2, is then chosen. A set of 2m2 digital words of m2 bits MNi is then generated (step 80).

Then, in step 81, N2 selected digital words $MNS_i$ are selected from among the set of $2^{m2}$ digital words, in such a way that each selected digital word differs from all the other selected digital words by a number of bits at least equal to h, the integer h representing the minimum Hamming distance.

Address words are then generated (step 82) and are respectively assigned (step 83) to the N2 address blocks. More precisely, the address words $MAD_j$ assigned to address block 1 all have m2 most significant bits, corresponding to the m2 bits of the selected digital word MNS1. The remaining n2-m2 bits can be used to define a plurality of address words which all have the same most significant bits.

Similarly, the address words $MADN2_j$ assigned to address block N2 all have, as their m2 most significant bits, the m2 bits of the selected digital word $MNS_{N2}$.

The different address blocks are then associated, in step 84, with N2 elements of the data processing system.

Figure 10:
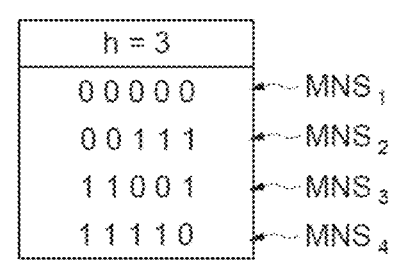

Thus, by way of example, as shown in FIG. 10, if n2=32, m2=5 and h=3 are chosen, only four selected digital words $MNS_1$-$MNS_4$ are obtained, these words forming four groups of address words distinguished from each other by their most significant bits. It will be possible to assign these four groups of address words to four address blocks associated with four elements, for example the storage unit MM1, the storage unit MM2, the storage unit MM3 and the set of peripherals $PH_i$.

It then becomes particularly difficult for an attacker who wishes to carry out a fault injection attack to move from one address block to another, as this would require the simultaneous modification of 3 bits among the 5 most significant bits in order to have a chance of obtaining a valid address from another block.

It is entirely possible that at least one of the address blocks has M address sub-blocks.

This is the case, for example, with the address block assigned to the set of peripherals. In fact, the set of peripherals $PH_i$ can be divided into M subsets of peripherals, each subset containing peripherals of the same type.

The addressing of these sub-blocks can then be secured, in the same way as that described above.

Figure 11:
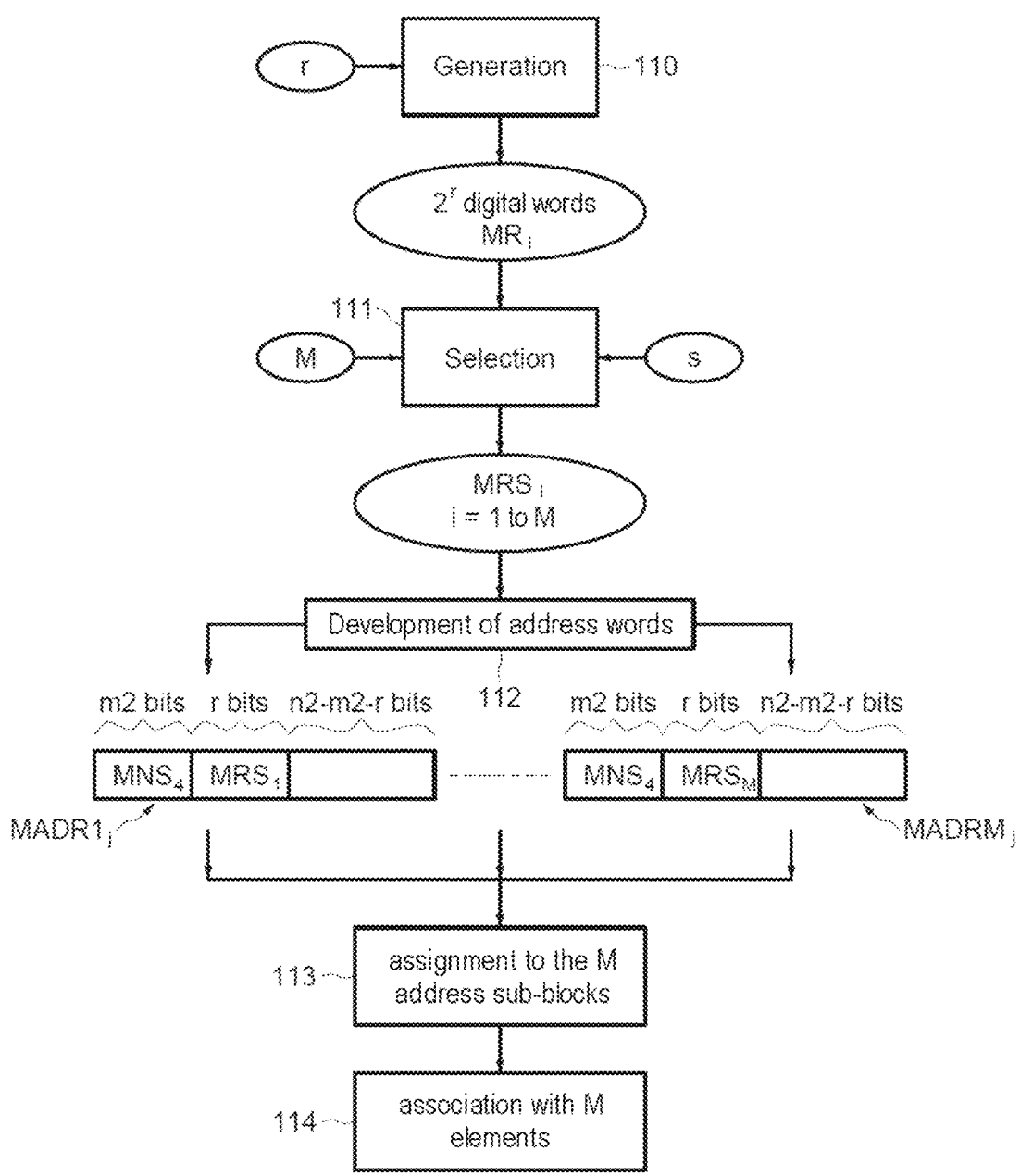

More precisely, as shown in FIG. 11, a set of $2^r$ digital words of r bits is generated, r being less than or equal to n2-m2, and greater than or equal to 2. Then, in step 111, M selected digital words $MRS_i$ are selected from among the $2^r$ digital words $MR_i$, taking into account the minimum Hamming distance, equal to an integer s greater than or equal to 2 (here again, s represents the minimum Hamming distance and may be chosen so as to be equal to or different from h).

Here again, each selected digital word $MRS_i$ differs from all the other selected digital words by a number of bits at least equal to s.

Address words are then generated (step 112).

More precisely, it is assumed in this example that it is address block 4 (in which all the address words have the selected digital word $MNS_4$ as their m2 most significant bits) that has M address sub-blocks.

In this case, the address words $MADR1_j$ assigned to the first address sub-block include, as regards these r bits following the m2 most significant bits, the selected digital word $MRS_1$.

The remaining n2-m2-r bits can be used to define a plurality of address words $MADR1_j$, enabling the peripherals of the corresponding subset of peripherals to be assigned individually.

Similarly, all the address words $MADRM_j$ have, as their m2 most significant bits, the m2 bits of the selected digital word $MNS_4$, and then have, as the following r bits, the r bits of the selected digital word $MRS_M$.

These address words assigned to the M address sub-blocks (step 113) are then associated with the M subsets of peripherals.

The selection of the different digital words and their distribution within at least one group can be carried out by using the same algorithm as that described with reference to FIG. 7.

Figure 12:
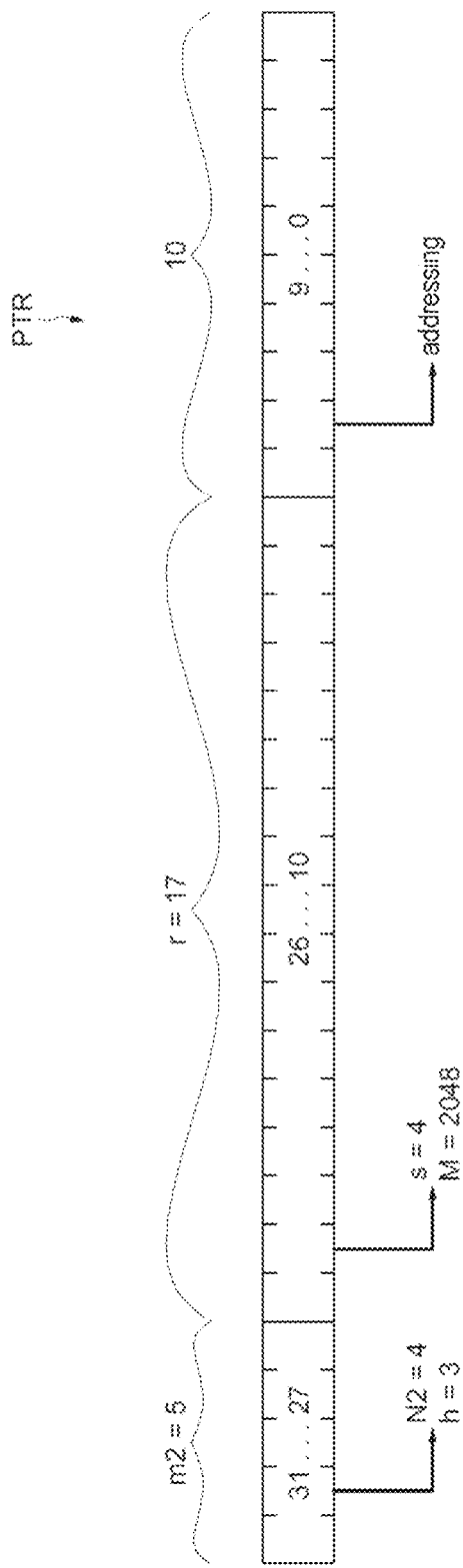

In the example described, and as shown in FIG. 12, the 32-bit address pointer PTR therefore includes 5 most significant bits in such a way that 4 address blocks with a minimum Hamming distance equal to 3 can be differentiated, and, within an address block, at least 2048 address sub-blocks can be differentiated over 17 bits with a Hamming distance at least equal to 4. The remaining 10 bits can be used for the individual addressing of peripherals, for example.

What is claimed is:

1. A smartcard comprising:
a controller configured to execute instructions from a set of secured instructions, the set of secured instructions comprising
a first set of N1 instructions of m1 bits, wherein
m1 is a positive integer number,
N1 is a positive integer number,
$2^{m1}$ is greater than N1, and
each instruction of the first set differ from all other instructions of the first set by a number of bits greater than or equal to p1, p1 being a positive integer number greater than or equal to 2.

2. The smartcard of claim 1, further comprising an integrated circuit, the integrated circuit comprising the controller.

3. The smartcard of claim 1, further comprising a storage unit configured to store program instructions compatible with the set of secured instructions.

4. The smartcard of claim 1, wherein the set of secured instructions further comprises a set of invalid instructions, the set of invalid instructions being non-overlapping with the first set.

5. The smartcard of claim 4, wherein the controller is further configured to issue an alert when the controller executes an instruction of the set of invalid instructions.

6. The smartcard of claim 1, wherein the set of secured instructions further comprises a second set of N2 instructions of m2 bits, wherein
m2 is a positive integer number,
N2 is a positive integer number,
$2^{m2}$ is greater than N2, and
each instruction of the second set differ from all other instructions of the second set by a number of bits greater than or equal to p2, p2 being a positive integer number greater than or equal to 9.

7. The smartcard of claim 6, wherein instructions of the second set are instructions of a same type of operation.

8. The smartcard of claim 7, wherein flipping a bit of an instruction of the second set results in an instruction of the first set.

9. A method for securing a smartcard, the method comprising:
generating a first set of N1 instructions of m1 bits, wherein
m1 is a positive integer number,
N1 is a positive integer number,
$2^{m1}$ is greater than N1, and
each instruction of the first set differ from all other instructions of the first set by a number of bits greater than or equal to pi, pi being a positive integer number greater than or equal to 2; and
configuring a controller to make it capable of executing each instruction of the first set.

10. The method of claim 9, further comprising storing program instructions compatible with the first set in a storage unit coupled to the controller.

11. The method of claim 10, further comprising generating a set of invalid instructions, the set of invalid instructions being non-overlapping with the first set.

12. The method of claim 11, further comprising issuing an alert when executing an instruction of the set of invalid instructions.

13. The method of claim 11, further comprising blocking the smartcard when executing an instruction of the set of invalid instructions.

14. The method of claim 9, further comprising generating a second set of N2 instructions of m2 bits, wherein
m2 is a positive integer number,
N2 is a positive integer number,
$2^{m2}$ is greater than N2, and
each instruction of the second set differ from all other instructions of the second set by a number of bits greater than or equal to p2, p2 being a positive integer number greater than or equal to 2.

15. The method of claim 14, wherein instructions of the second set are instructions of a same type of operation.

16. The method of claim 15, wherein flipping a bit of an instruction of the second set results in an instruction of the first set.

17. A method comprising:
selecting a first set of N1 codes from a first group of $2^{m1}$ codes, wherein
m1 is a positive integer number,
N1 is a positive integer number,
$2^{m1}$ is greater than N1, and
each code of the first set differ from all other codes of the first set by a number of bits greater than or equal to p, p being a positive integer number greater than or equal to 2;
selecting a second set of N2 codes from the first group, wherein the first set and the second set are non-overlapping; and
storing codes of the first set into a storage device.

18. The method of claim 17, further comprising configuring a controller to make it capable of executing instructions having instruction codes corresponding to codes of the first set.

19. The method of claim 17, wherein N2 is zero.

20. The method of claim 17, wherein the second set corresponds to a set of invalid instructions.

21. A method of operating a smartcard, the method comprising:
retrieving a first instruction from a storage device, wherein
the first instruction is an instruction from a set of secured instruction,
the set of secured instructions comprising a first set of N1 instructions of m1 bits,
m1 is a positive integer number,
N1 is a positive integer number,
$2^{m1}$ is greater than N1, and
each instruction of the first set differ from all other instructions of the first set by a number of bits greater than or equal to p1, p1 being a positive integer number greater than or equal to 2; and
executing the secured instruction.

22. The method of claim 21, wherein the set of secured instructions further comprises a set of invalid instructions, the set of invalid instructions being non-overlapping with the first set, the method further comprising:
executing a second instruction from the set of invalid instructions; and
issuing an alert after executing the second instruction.

* * * * *

UNITED STATES PATENT AND TRADEMARK OFFICE
CERTIFICATE OF CORRECTION

| | | |
|---|---|---|
| PATENT NO. | : 9,916,281 B2 | Page 1 of 1 |
| APPLICATION NO. | : 15/600006 | |
| DATED | : March 13, 2018 | |
| INVENTOR(S) | : Philippe Escalona | |

It is certified that error appears in the above-identified patent and that said Letters Patent is hereby corrected as shown below:

In Column 11, Line 51, Claim 9, delete "equal to pi, pi being a positive integer number" and insert --equal to p1, p1 being a positive integer number--.

Signed and Sealed this
Fifth Day of June, 2018

Andrei Iancu
*Director of the United States Patent and Trademark Office*